(12) United States Patent  
Hochberg et al.

(10) Patent No.: US 9,251,010 B2  
(45) Date of Patent: Feb. 2, 2016

(54) CACHING BACKED-UP DATA LOCALLY UNTIL SUCCESSFUL REPLICATION

(71) Applicant: International Business Machines Corporation, Armonk, NY (US)

(72) Inventors: Avishai H. Hochberg, San Jose, CA (US); Kevin P. Hoyt, San Jose, CA (US); Howard N. Martin, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 13/799,313

(22) Filed: Mar. 13, 2013

(65) Prior Publication Data

US 2014/0281257 A1 Sep. 18, 2014

(51) Int. Cl.
*G06F 12/00* (2006.01)
*G06F 13/00* (2006.01)
*G06F 11/14* (2006.01)
*G06F 3/06* (2006.01)
*G06F 11/20* (2006.01)

(52) U.S. Cl.
CPC ............ *G06F 11/1456* (2013.01); *G06F 3/065* (2013.01); *G06F 3/0619* (2013.01); *G06F 3/0683* (2013.01); *G06F 11/1446* (2013.01); *G06F 11/2056* (2013.01); *G06F 11/2094* (2013.01); *G06F 11/2074* (2013.01)

(58) Field of Classification Search
CPC ............ G06F 11/1445; G06F 11/2056; G06F 3/0619; G06F 3/065; G06F 3/0683
See application file for complete search history.

(56) References Cited

U.S. PATENT DOCUMENTS

| 7,707,453 | B2 | 4/2010 | Winokur | |
| 2004/0236983 | A1* | 11/2004 | Burton et al. | ...................... 714/6 |
| 2008/0209145 | A1 | 8/2008 | Ranganathan et al. | |
| 2011/0167233 | A1* | 7/2011 | Sekine et al. | ................. 711/162 |

* cited by examiner

*Primary Examiner* — Edward Dudek, Jr.
(74) *Attorney, Agent, or Firm* — Francis Lammes; Stephen J. Walder, Jr.; Feb R. Cabrasawan

(57) ABSTRACT

A mechanism is provided for caching backed-up data locally until successful replication of the backed-up data. Responsive to an indication to back up one or more pieces of identified data from a local storage device, a determination is made as to whether a primary storage device is available. Responsive to the primary storage device being available, the one or more pieces of identified data are backed up to the primary storage device and a local replication cache. Responsive to the backed-up data being replicated from the primary storage device to a secondary storage device, the backed-up data is removed from the local replication cache.

18 Claims, 7 Drawing Sheets

| TIME INTERVAL | LOCAL REPLICATION CACHE | PRIMARY STORAGE DEVICE | SECONDARY STORAGE DEVICE |
|---|---|---|---|
| 601 | IDENTIFIED DATA 1 | IDENTIFIED DATA 1 | |
| 602 | IDENTIFIED DATA 1 | IDENTIFIED DATA 1 | IDENTIFIED DATA 1 |
| 603 | | IDENTIFIED DATA 1 | IDENTIFIED DATA 1 |
| 604 | IDENTIFIED DATA 2 | IDENTIFIED DATA 1 | IDENTIFIED DATA 1&2 |
| 605 | IDENTIFIED DATA 2 | IDENTIFIED DATA 1&2 | IDENTIFIED DATA 1&2 |
| 606 | | IDENTIFIED DATA 1&2 | IDENTIFIED DATA 1&2 |

*FIG. 6*

| TIME INTERVAL | LOCAL REPLICATION CACHE | PRIMARY STORAGE DEVICE | SECONDARY STORAGE DEVICE |
|---|---|---|---|
| 701 | IDENTIFIED DATA 1 | IDENTIFIED DATA 1 | |
| 702 | IDENTIFIED DATA 1 | IDENTIFIED DATA 1 | IDENTIFIED DATA 1 |
| 703 | | IDENTIFIED DATA 1 | IDENTIFIED DATA 1 |
| 704 | IDENTIFIED DATA 2 | IDENTIFIED DATA 1 | IDENTIFIED DATA 1&2 |
| 705 | IDENTIFIED DATA 2 | IDENTIFIED DATA 1&2 | IDENTIFIED DATA 1&2 |
| 706 | IDENTIFIED DATA 2 | IDENTIFIED DATA 1&2 | IDENTIFIED DATA 1&2 |
| 707 | | IDENTIFIED DATA 1&2 | IDENTIFIED DATA 1&2 |

*FIG. 7*

CACHING BACKED-UP DATA LOCALLY UNTIL SUCCESSFUL REPLICATION

BACKGROUND

The present application relates generally to an improved data processing apparatus and method and more specifically to mechanisms for caching backed-up data locally until replication of the backed-up data is successful.

Replication in computing involves sharing information so as to ensure consistency between redundant resources, such as software or hardware components, to improve reliability, fault-tolerance, or accessibility. Two main types of replication are asynchronous replication and synchronous replication. Asynchronous replication is a "store and forward" approach to data backup. Asynchronous replication writes data to a storage array first and then, depending on the implementation approach, commits data to be replicated to a primary storage site. Asynchronous replication then copies the data in real-time or at scheduled intervals to a secondary storage site. However, one downside to asynchronous replication is the possibility of data loss if the primary site should happen to fail before the data has been written to the secondary site. In contrast, synchronous replication writes data to a primary site and a secondary site at the same time so that the data remains current between sites. However, synchronous replication is more expensive than other forms of replication and introduces latency that slows down the primary application.

In both asynchronous replication and synchronous replication, if there is a failure in a backup or a replication process, the most widely utilized recovery solution resets backups at the secondary site by performing a full backup. In fact, when using a full+incremental or a full+differential backup scheme, a full backup is a requirement. However, performing a full backup may not be acceptable to customers, such as in systems that rely upon, for example, journaling, which is a method to keep track of file system changes and are generally so large that it may not be possible to scan the files. The same is true for databases that may be many terabytes or petabytes in size and backing such databases up in the event of a failure is not reasonably feasible.

SUMMARY

In one illustrative embodiment, a method, in a data processing system, is provided for caching backed-up data locally until successful replication of the backed-up data. The illustrative embodiment determines whether a primary storage device is available in response to an indication to back up one or more pieces of identified data from a local storage device. The illustrative embodiment backs up the one or more pieces of identified data to the primary storage device and a local replication cache in response to the primary storage device being available. The illustrative embodiment removes the backed-up data from the local replication cache in response to the backed-up data being replicated from the primary storage device to a secondary storage device.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 6 depicts an example of the operation performed when the primary storage device is available for a first backup but becomes unavailable before a second back up in accordance with an illustrative embodiment;

FIG. 7 depicts an alternative example of the operation performed when the primary storage device is available for a first backup but becomes unavailable before a second back up in accordance with an illustrative embodiment.

DETAILED DESCRIPTION

The illustrative embodiments provide for caching backed-up data locally until replication of the backed-up data is successful. In operation, when data is backed up from a client device, the data is written to a local cache as well as being written to a primary storage device. The data is also marked as un-replicated. Then, as the data is successfully replicated from the primary storage device to a secondary storage device, the replicated data in the primary storage device is marked as replicated. Once an acknowledgement is made that the data has been successfully replicated from the primary storage device to the secondary storage device, data that is marked as replicated in the local cache is removed from the local cache.

Figure 1:
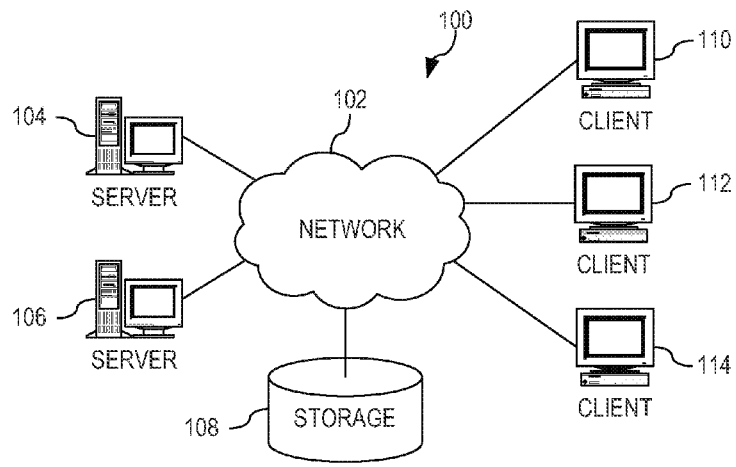
FIG. 1 is an example diagram of a distributed data processing system in which aspects of the illustrative embodiments may be implemented.
Figure 2:
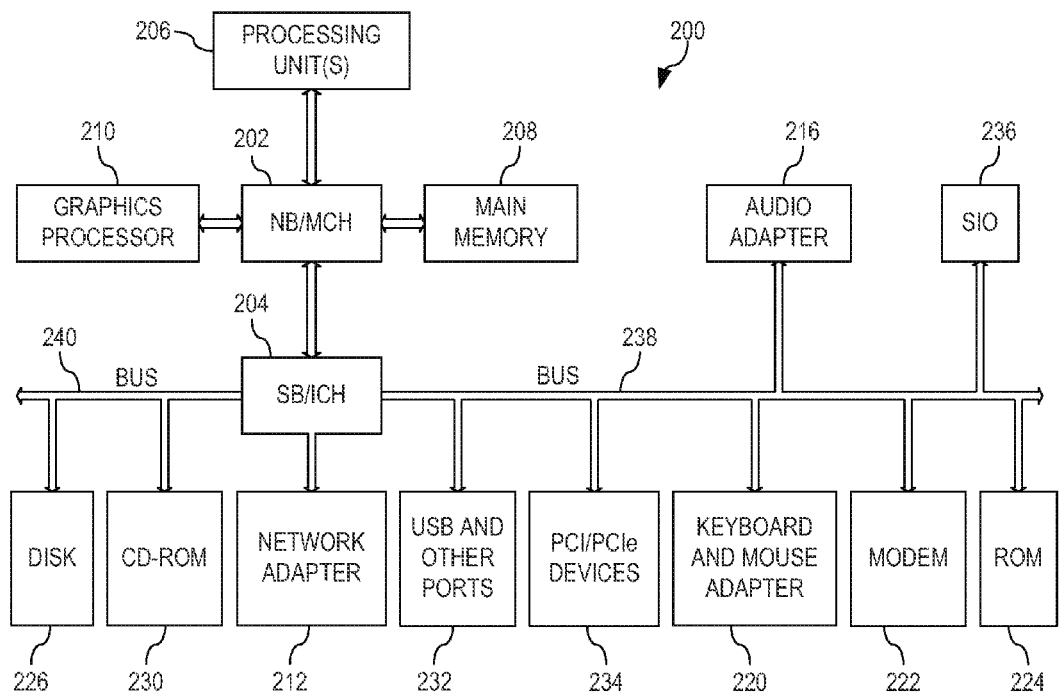
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. Although not illustrated, each of servers 104 and 106 may have directly attached storage units. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
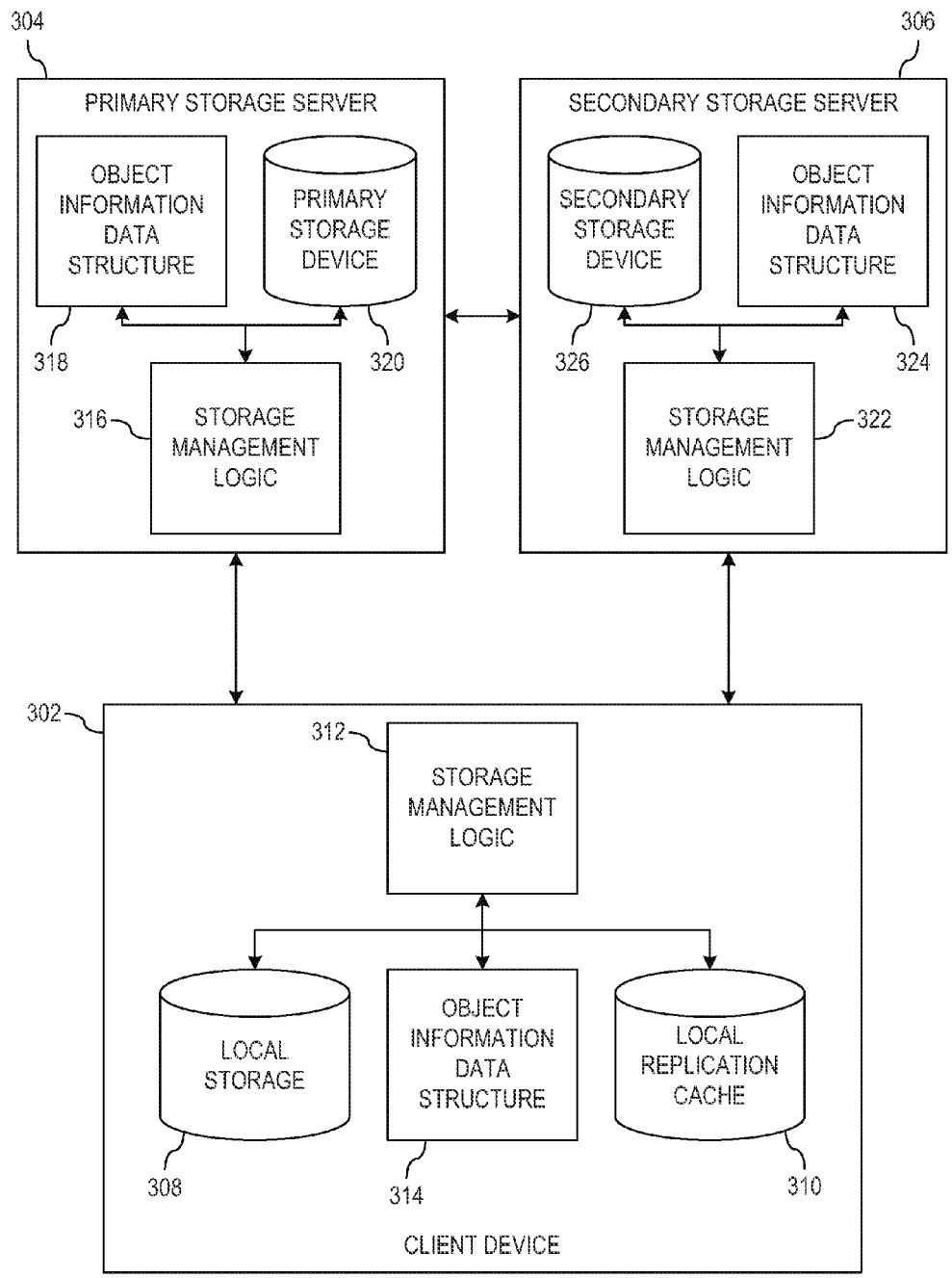
FIG. 3 depicts a replication mechanism that provides a solution to both asynchronous replication and synchronous replication failures in accordance with an illustrative embodiment.

Again, current solutions to an asynchronous replication or synchronous replication failure may not be acceptable to many enterprise customers. Thus, the illustrative embodiments provide for caching backed-up data locally until replication of the backed-up data is successful FIG. 3 depicts a replication mechanism that provides a solution to both asynchronous replication and synchronous replication failures in accordance with an illustrative embodiment. Data processing system 300 client device 302, primary storage server 304, and secondary storage server 306. Client device 302 comprises local storage 308, local replication cache 310, storage management logic 312, and object information data structure 314. Primary storage server 304 comprises storage management logic 316, object information data structure 318, and primary storage device 320. Secondary storage server 306 comprises storage management logic 322, object information data structure 324, and secondary storage device 326.

In operation, during an initial or subsequent back up of the data in local storage 308, storage management logic 312 identifies one or more pieces of data for back up in local storage 308. The data may be new data or modified data that is identified for back up and is data important to the enterprise customer that is utilizing client device 302, which may include files, databases, virtual machines, journal based data, cataloged databases, file systems, or the like. Storage management logic 312 creates a backup of the one or more pieces of data on local storage 308 in primary storage server 304. As storage management logic 312 backs up each piece of data, storage management logic 312 associates a unique identifier (ID) with that piece of data. Storage management logic 312 stores this unique ID along with the data being stored in primary storage server 304 as well as a record of the piece of data and the unique ID in object information data structure 314 utilized by storage management logic 312. In accordance with the illustrative embodiments, in addition to storage management logic 312 backing up the identified data to primary storage server 304, storage management logic 312 also stores each piece of identified data and its unique ID in local replication cache 310. As the data has not yet been replicated to secondary storage server 306, storage management logic 312 further marks the record for each piece of data in object information data structure 314 as requiring replication. Storage management logic 312 only considers the backup of each piece of data to be successful if both the transfer to primary storage server 304 local replication cache 310 are successful.

When storage management logic 316 in primary storage server 304 the data from storage management logic 312, storage management logic 316 the data along with the unique ID in primary storage device 320. Storage management logic 316 further stores a record of the piece of data and the unique ID in object information data structure 318. As the data has not yet been replicated to secondary storage server 306, storage management logic 316 further marks the record for each piece of data in object information data structure 318 as requiring replication.

In order to replicate the data on primary storage server 304 to secondary storage server 306 so that another copy of the backed-up data exists, storage management logic 316 on primary storage server 304 initiates a replication process. As the replication process begins, storage management logic 316 copies each piece of data from primary storage device 320 to secondary storage device 326 in secondary storage server 306, which includes the unique ID associated with each piece of data.

When storage management logic 322 in secondary storage server 306 the data from storage management logic 316, storage management logic 322 the data along with the unique ID in secondary storage device 326. Storage management logic 322 further stores a record of the piece of data and the unique ID in object information data structure 324. As each piece of data is successfully replicated to secondary storage device 326, storage management logic 322 updates the record for each piece of data in object information data structure 324 as being replicated. Further, storage management logic 316 updates the record, for each piece of data in object information data structure 318 as being replicated.

During a subsequent back up operation, storage management logic 316 object information data structure 314 via storage management logic 312 with updates of all the records of data that has been successfully replicated from primary storage device 320 to secondary storage device 326. Storage management logic 312 the unique ID of each data record in object information data structure 314 has been successfully replicated to the data in local replication cache 310. If storage management logic 312 determines that a piece of data in local replication cache 310 has been successfully replicated based on the associated record in object information data structure 314, then storage management logic 312 removes that piece of data from local replication cache 310. However, if storage management logic 312 determines that a piece of data in local replication cache 310 fails to have been successfully replicated based on the associated record in object information data structure 314, then storage management logic 312 leaves the piece of data in local replication cache 310.

The illustrative embodiments recognize that local replication cache 310 require one or more special attributes and/or capabilities. That is, if local replication cache 310 shared its space with local storage 308 in client device 302, then local replication cache 310 may be configured to a specific maximum or percentage of local storage 308 within client device 302. If the space available for local replication cache 310 is limited, then local replication cache 310 may continue to fill to a maximum size. Once the maximum size is reached, storage management logic 312 may prune local replication cache 310 by first removing data that are validated to be both on primary storage server 304 and secondary storage server 306 not already removed by the previously described process. Next, if validation fails, then storage management logic 312 may remove the oldest version of the data from local replication cache 310. In the event that storage management logic 312 may not be able to prune local replication cache 310 in either of these manners, then storage management logic 312 may cancel all backups until both primary storage server 304 secondary storage server 306 are available and replication may be performed.

If the space available for local replication cache 310 is unlimited, then local replication cache 310 would keep all data until replication between primary storage server 304 and secondary storage server 306 is successful. This would be important when primary storage server 304 is unavailable as local replication cache 310 would have a second copy of the data. The copy of data in local replication cache 310 would be further protection against secondary storage server 306 becoming unavailable before primary storage server 304 is available. Once both primary storage server 304 and secondary storage server 306 are available and replication is successful, storage management logic 312 will remove the successfully replicated data from local replication cache 310.

As further attributes and/or capabilities, local replication cache 310 may be:
  compressed, thus using less local disk space;
  encrypted;
  used with client side de-duplication, storing only the chunks, rather than storing entire pieces of data;
  force validation of the replication status of the data in the local cache;
  force the local cache to be cleared; or
  NOT use the cache for the first full incremental, thereby reducing the initial size of local replication cache 310 by only storing subsequent backed-up data.

Thus, in a normal operation, storage management logic 312 backs up an identified piece of data from local storage 308 to both primary storage server 304 and local replication cache 310. Then, once the piece of data has been successfully replicated from primary storage server 304 to secondary storage server 306, storage management logic 312 removes the associated piece of data stored in local replication cache 310. If the piece of data is not successfully replicated during an initial replication process, then, if the piece of data is successfully replicated during a subsequent replication process, storage management logic 312 removes the associated piece of data from local replication cache 310 upon a successful indication of the replication process. Otherwise, the associated piece of data remains in local replication cache 310 as another copy of the data.

The process performed by storage management logic 312 also provides protection for numerous errors that may occur in data processing system 300. For example, an error may be recognized if data is successfully backed up from local storage 308 to primary storage server 304 but primary storage server 304 then becomes unavailable to perform replication with secondary storage server 306. In this event, at a next back up interval, storage management logic 312 performs the back up process with secondary storage server 306, since primary storage server 304 unavailable. Then, once primary storage server 304 becomes available once again, storage management logic 312 initiates a replication process between primary storage server 304 and secondary storage server 306. In this replication process, storage management logic 312 copies each unique piece of data from primary storage server 304 to secondary storage server 306, which includes the unique ID associated with each piece of data. Similarly, storage management logic 312 copies each unique piece of data from secondary storage server 306 to primary storage server 304, which includes the unique ID associated with each piece of data. As each piece of data is successfully replicated, storage management logic 312 updates the record for each piece of data in object information data structure 314 as being replicated.

Once storage management logic 312 updates object information data structure 314 all the records of data that has been successfully replicated, storage management logic 312 compares the unique ID of each data record in object information data structure 314 that it has been successfully replicated to the data in local replication cache 310. If storage management logic 312 determines that a piece of data in local replication cache 310 has been successfully replicated based on the associated record in object information data structure 314, then storage management logic 312 removes that piece of data from local replication cache 310. However, if storage management logic 312 determines that a piece of data in local replication cache 310 fails to have been successfully replicated based on the associated record in object information data structure 314, then storage management logic 312 leaves the piece of data in local replication cache 310.

As another example, if the same error is recognized when data is successfully backed up from local storage 308 to primary storage server 304 but primary storage server 304 then becomes unavailable to perform replication with secondary storage server 306, at a next back up interval, storage management logic 312 performs the back up process with secondary storage server 306, since primary storage server 304 is unavailable. However, once primary storage server 304 available, storage management logic 312 may not automatically start the replication process between primary storage server 304 and secondary storage server 306. In this alternative illustrative embodiment, once primary storage server 304 available, storage management logic 312 may wait until the next back up interval occurs and back up all data from local storage 308 to primary storage server 304 that has not been previously backed up to primary storage server 304. Then, when the next replication process occurs, storage management logic 312 will recognize that the same data that was backed up to secondary storage server 306 and then backed up to primary storage server 304 is on both primary storage server 304 and secondary storage server 306. In this instance, the data will not be replicated. However, upon noticing that the data exists both on primary storage server 304 and secondary storage server 306, storage management logic 312 updates the record for each piece of data in object information data structure 314 as being replicated. Once storage management logic 312 updates object information data structure 314, then storage management logic 312 removes that piece of data from local replication cache 310.

Figure 4:
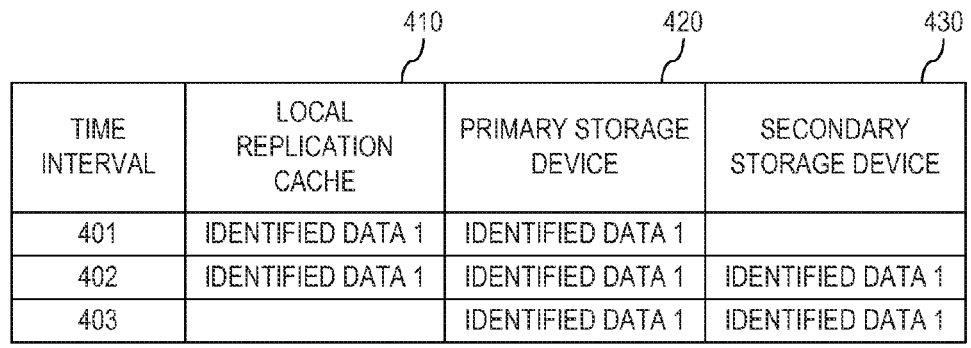
FIG. 4 depicts an example of the normal operation performed when the storage management logic backs up an identified piece of data from the local storage in accordance with an illustrative embodiment.

FIG. 4 depicts an example of the normal operation performed when the storage management logic backs up an identified piece of data from the local storage in accordance with an illustrative embodiment. At time interval 401, the storage management logic backs up an identified piece of data from the local storage to both the local replication cache 410 and the primary storage device 420. At time interval 402, the storage management logic then initiates a replication between the primary storage device 420 and the secondary storage device 430. At time interval 403, once the storage management logic validates that the piece of data has been successfully replicated from the primary storage device 420 to the secondary storage device 430, the storage management logic removes the associated piece of data stored from the local replication cache 410.

Figure 5:
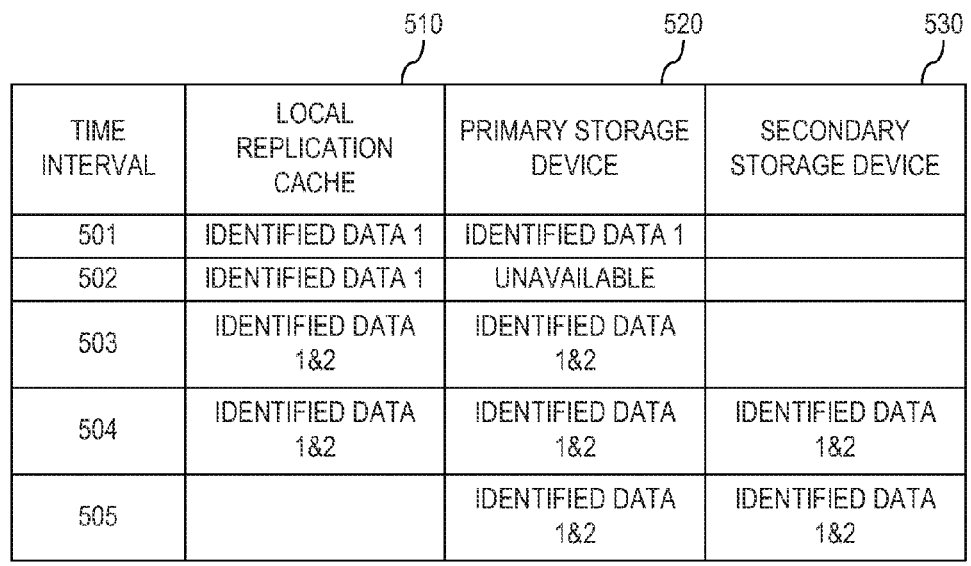
FIG. 5 depicts an example of the operation performed when the storage management logic backs up an identified piece of data but the primary storage device becomes unavailable before replication can occur in accordance with an illustrative embodiment.

FIG. 5 depicts an example of the operation performed when the storage management logic backs up an identified piece of data but the primary storage device becomes unavailable before replication can occur in accordance with an illustrative embodiment. At time interval 501, the storage management logic backs up an identified piece of data from the local storage to both the local replication cache 510 the primary storage device 520. At time interval 502, the storage management logic then initiates a replication but, the primary storage device has become unavailable. Thus, the data remains in the local replication cache 510 and the primary storage device 520. At time interval 503, the storage management logic performs a second back up from the local storage to both the local replication cache 510 and the primary storage device 520. At time interval 504, the storage management logic then initiates a replication between the primary storage device 520 the secondary storage device 530. At time interval 505, once the storage management logic validates that the piece of data has been successfully replicated from the primary storage device 520 to the secondary storage device 530, the storage management logic removes the associated piece of data stored from the local replication cache 510.

FIG. 6 depicts an example of the operation performed when the primary storage device is available for a first backup but becomes unavailable before a second back up in accordance with an illustrative embodiment. Similar to the process described with regard to FIG. 4, at time interval 601, the storage management logic backs up a first identified piece of data from the local storage to both the local replication cache 610 and the primary storage device 620. At time interval 602, the storage management logic then initiates a replication between the primary storage device 620 and the secondary storage device 630. At time interval 603, once the storage management logic validates that the piece of data has been successfully replicated from the primary storage device 620 to the secondary storage device 630, the storage management logic removes the associated piece of data stored from the local replication cache 610.

However, at time interval 604, die storage management logic attempts to perform a second back up from the local storage to both the local replication cache 610 and the primary storage device 620. However, the primary storage device 620 is now unavailable. Thus, in accordance with the illustrative embodiments, the storage management logic performs the second back up from the local storage to both the local replication cache 610 and the secondary storage device 630. At time interval 605, once the primary storage device 620 becomes available once again, the storage management logic initiates a replication process between the primary storage device 620 and secondary storage device 630. At time interval 606, once the storage management logic validates that the piece of data has been successfully replicated, the storage management logic removes the associated piece of data stored from the local replication cache 610.

FIG. 7 depicts an alternative example of the operation performed when the primary storage device is available for a first backup but becomes unavailable before a second back up in accordance with an illustrative embodiment. Similar to the process described with regard to FIG. 4, at time interval 701, the storage management logic backs up a first identified piece of data from the local storage to both the local replication cache 710 and the primary storage device 720. At time interval 702, the storage management logic then initiates a replication between the primary storage device 720 and the secondary storage device 730. At time interval 703, once the storage management logic validates that the piece of data has been successfully replicated from the primary storage device 720 to the secondary storage device 730, the storage management logic removes the associated piece of data stored from the local replication cache 710.

However, at time interval 704, the storage management logic attempts to perform a second back up from the local storage to both the local replication cache 710 and the primary storage device 720. However, the primary storage device 720 is now unavailable. Thus, in accordance with the illustrative embodiments, at time interval 704, the storage management logic performs the second back up from the local storage to both the local replication cache 710 and the secondary storage device 730. Once the primary storage device 720 becomes available once again, rather than performing the replication process as described in FIG. 6, the storage management logic waits until the next back up interval to occur. Therefore, at time interval 705, the storage management logic performs a third back up from the local storage to both the local replication cache 710 and the primary storage device 720.

However, since the second identified data already exists in the local replication cache 710, the storage management logic only backs up the second identified data to the primary storage device 720. At time interval 706, when the next replication process occurs, the storage management logic recognizes that the same data that was backed up to the secondary storage device 730 initially and then backed up to the primary storage device 720 is on both the primary storage device 720 and the secondary storage device 730. Thus, at time interval 706, the storage management logic performs no work with regard to the replication of the second intended data. Finally, a time interval 707, the storage management logic validates that the piece of data has been successfully replicated and removes the associated piece of data stored from the local replication cache 710.

Thus, the illustrative embodiments provide for caching backed-up data locally until replication of the backed-up data is successfully indicated. Further, the illustrative embodiments may provide protection for enterprise customers, in that, these enterprise customers know that their data is always backed up to at least two different storage locations.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on die computer, other programmable apparatus, or other devices to produce a computer implemented process such that the instructions which execute on the computer or other programmable apparatus provide processes for implementing the functions/acts specified in the flowchart and/or block diagram block or blocks.

Figure 8A:
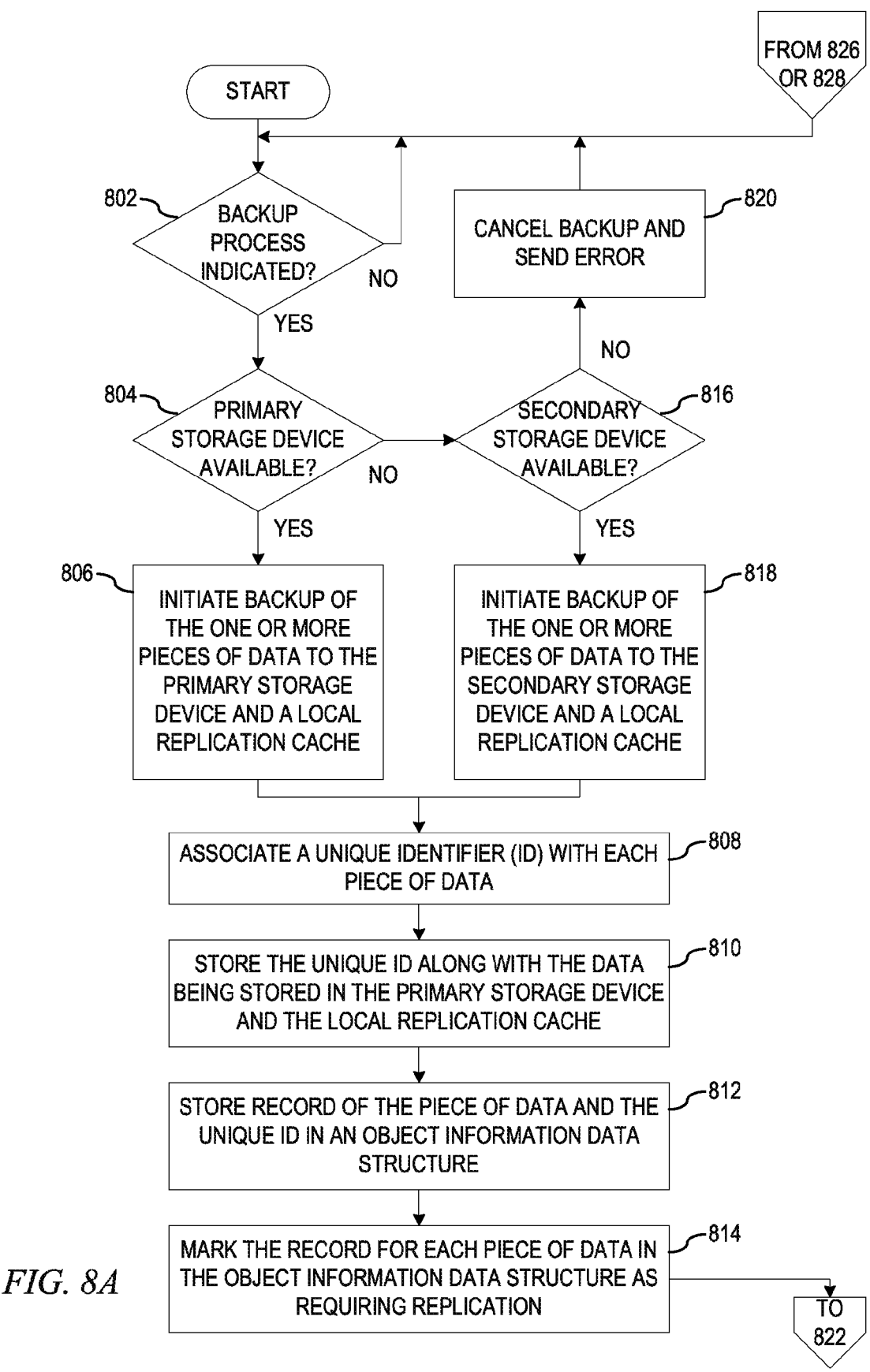
FIGS. 8A and 8B depict a flowchart of the operation performed by storage management logic in caching backed-up data locally until success replication of the backed-up data in accordance with an illustrative embodiment.
Figure 8B:
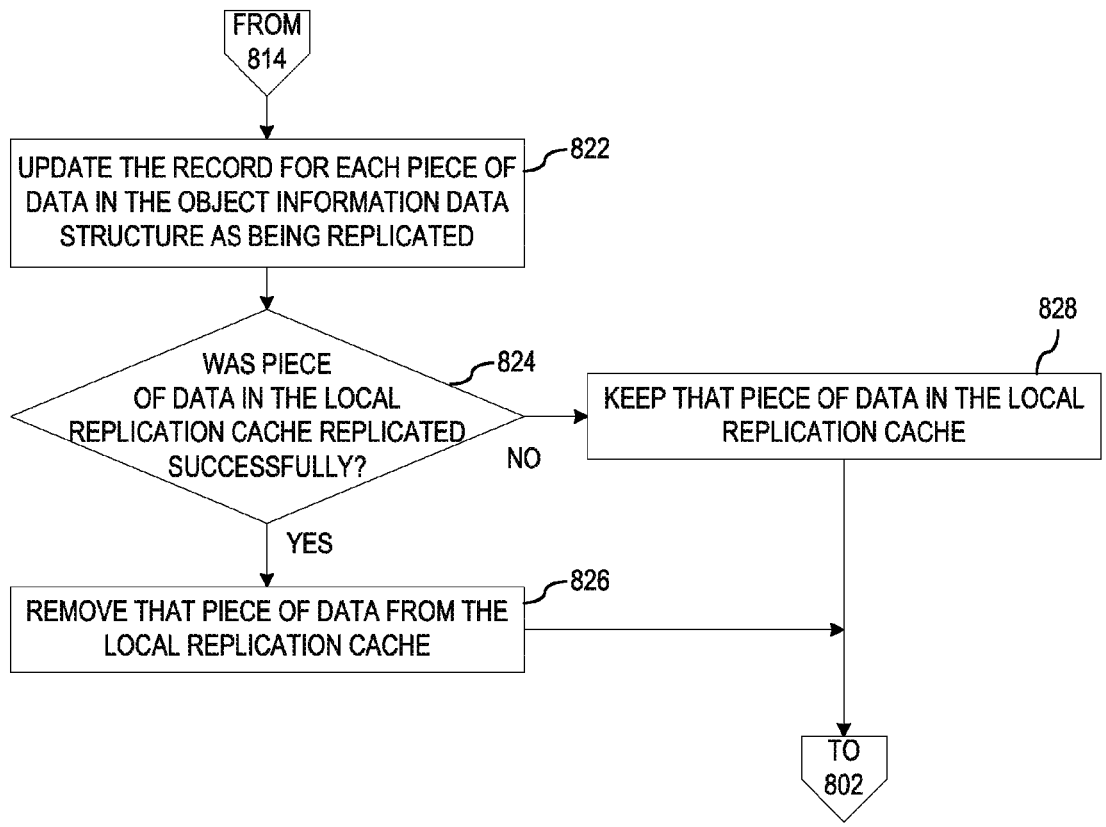

FIGS. 8A and 8B depict a flowchart of the operation performed by storage management logic in a client device caching backed-up data locally until success replication of the backed-up data in accordance with an illustrative embodiment. As the operation begins, storage management logic in a client device determines whether a back up process indication has been requested or a schedule initiated (step 802). If at step 802 the storage management logic in the client device determines that a back up process has not be requested or a schedule initiated, then the operation returns to step 802 for the next time interval. If at step 802 the storage management logic in the client device determines that a back up process has been requested or a schedule initiated, then the storage management logic in the client device determines whether a primary storage server is available (step 804).

If at step 804 the storage management logic in the client device determines that the primary storage server is available, the storage management logic in the client device initiates a back up of the one or more pieces of data on a local storage in the client device to the primary storage server and a local replication cache (step 806). As the storage management logic in the client device backs up each piece of data, the storage management logic in the client device associates a unique identifier (ID) with that piece of data (step 808). The storage management logic in the client device stores this unique ID along with the data being stored in the primary storage server and the local replication cache (step 810) as well as a record of the piece of data and the unique ID in an object information data structure (step 812). As the data has not yet been replicated to a secondary storage device, the storage management in the client device logic further marks the record for each piece of data in the object information data structure as requiring replication (step 814).

If at step 804 the storage management logic in the client device determines that the primary storage server fails to be available, the storage management logic in the client device determines whether a secondary storage server is available (step 816). If at step 816 the storage management logic in the client device determines that the secondary storage server is available, the storage management logic in the client device initiates a back up of the one or more pieces of data on a local storage in a client device to the secondary storage server and the local replication cache (step 818), with the operation proceeding to step 808 thereafter. If at step 816 the storage management logic in the client device determines that the secondary storage server fails to be available, the storage management logic in the client device cancels the back up process and sends an error (step 820), with the operation returning to step 802 to wait for the next request and/or scheduled initiated back up process. From step 814 and during a subsequent back up process, the storage management logic in the client device updates the record for each piece of data in the object information data structure (step 822).

The storage management logic in the client device compares the unique ID of each data record in object information data structure that has been successfully replicated to the data in the local replication cache (step 824). If at step 824 the storage management logic in the client device determines that a piece of data in the local replication cache has been successfully replicated based on the associated record in the object information data structure, then the storage management logic in the client device removes that piece of data from the local replication cache (step 826), with the operation returning to step 802 thereafter. However, if at step 824 the storage management logic in the client device determines that a piece of data in the local replication cache has yet to be successfully replicated based on the associated record in the object information data structure, then the storage management logic keeps the piece of data in the local replication cache (step 828), with the operation returning to step 802 thereafter.

Figure 9:
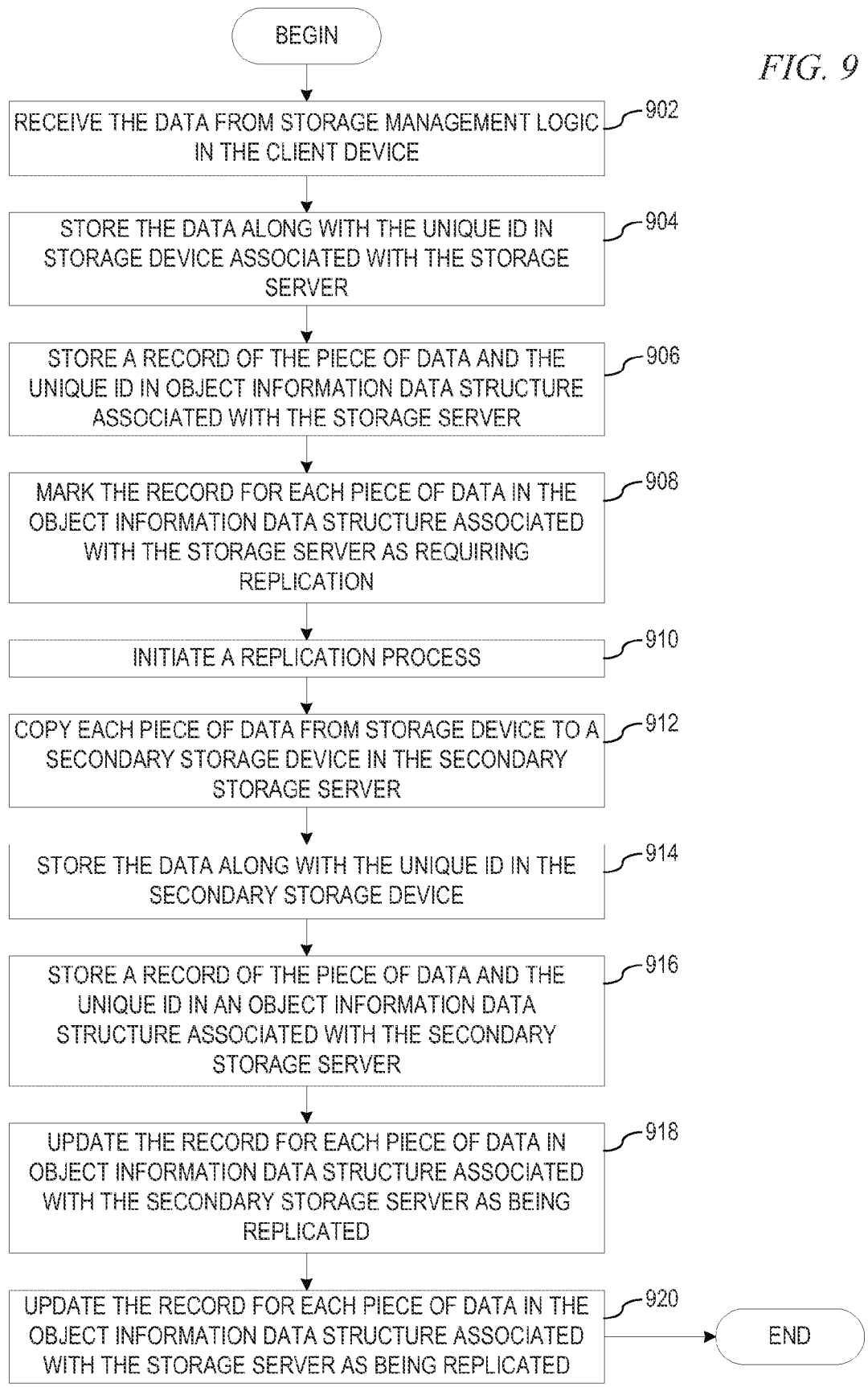
FIG. 9 depicts a flowchart of the operation performed by storage management logic in a set of storage servers working in conjunction with storage management logic in a client device in accordance with an illustrative embodiment.

FIG. 9 depicts a flowchart of the operation performed by storage management logic in a set of storage servers working in conjunction with storage management logic in a client device in accordance with an illustrative embodiment. As the operation begins, the storage management logic in the storage server receives the data from storage management logic in the client device (step 902). The storage management logic in the storage server stores the data along with the unique ID in storage device associated with the storage server (step 904). The storage management logic in the storage server further stores a record of the piece of data and the unique ID in object information data structure associated with the storage server (step 906). As the data has not yet been replicated to a secondary storage server, the storage management logic in the storage server further marks the record for each piece of data in the object information data structure associated with the storage server as requiring replication (step 908).

In order to replicate the data on the storage server to the secondary storage server so that another copy of the backed-up data exists, the storage management logic on storage server initiates a replication process (step 910). As the replication process begins, the storage management logic in the storage server copies each piece of data from storage device to a secondary storage device in the secondary storage server (step 912), which includes the unique ID associated with each piece of data.

When the storage management logic in the secondary storage server receives the data from storage management logic in the storage server, the storage management logic stores the data along with the unique ID in the secondary storage device (step 914). The storage management logic in the secondary storage server further stores a record of the piece of data and the unique ID in an object information data structure associated with the secondary storage server (step 916). As each piece of data is successfully replicated to the secondary storage device, the storage management logic in the secondary storage server updates the record for each piece of data in object information data structure associated with the secondary storage server as being replicated (step 918). Further, the storage management logic in the storage server updates the record for each piece of data in the object information data structure associated with the storage server as being replicated (step 920), with the operation ending thereafter.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for caching backed-up data locally until replication of the backed-up data is successful. Utilizing the aspects of the illustrative embodiment, recovery from a failure to a primary storage device no longer requires a full backup of data from the local storage. If the primary storage device is destroyed before replication completes, subsequent backups are redirected to the secondary storage device until the primary storage device is available. Thus, the back up solution of the illustrative embodiments continues to use an asynchronous replication process, which meets the demands of the back up environment, and provides the robustness of a synchronous replication.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for caching backed-up data locally until successful replication of the backed-up data, the method comprising:
responsive to an indication to back up one or more pieces of identified data from a local storage device, determining whether a primary storage device is available;
responsive to the primary storage device being available, backing up the one or more pieces of identified data to the primary storage device and a local replication cache; and
responsive to the backed-up data being replicated from the primary storage device to a secondary storage device, removing the backed-up data from the local replication cache, wherein the backed-up data being replicated from the primary storage device to the secondary storage device is identified by the method comprising:
updating a record for each piece of identified data in an object information data structure as being replicated;
comparing a unique ID associated with each record in the object information data structure that has been successfully replicated to a unique ID associated with each piece of identified data in the local replication cache;

responsive to matching the unique ID associated with a record in the object information data structure that has been successfully replicated to the unique ID associated with a piece of identified data in the local replication cache, removing the piece of identified data from the local replication cache; and responsive to a failure to match the unique ID associated with a record in the object information data structure that has been successfully replicated to a unique ID associated with a piece of identified data in the local replication cache, keeping the piece of identified data in the local replication cache.

2. The method of claim 1, wherein backing up the one or more pieces of identified data to the primary storage device and the local replication cache further comprises:

associating a unique identifier (ID) with each piece of identified data in the one or more pieces of identified data;

storing the unique ID along with its associated piece of identified data in the primary storage device and the local replication cache;

creating a record of each piece of identified data and the unique ID associated with the piece of identified data in an object information data structure; and marking the record of each piece of identified data in the object information data structure as requiring replication.

3. The method of claim 1, further comprising:

responsive to the primary storage device being unavailable, determining whether the secondary storage device is available;

responsive to the secondary storage device being available, backing up the one or more pieces of identified data to the secondary storage device and the local replication cache; and responsive to the backed-up data being replicated from the secondary storage device to the primary storage device, removing the backed-up data from the local replication cache.

4. The method of claim 3, further comprising:

responsive to the secondary storage device being unavailable, canceling the back up of the one or more pieces of identified data from the local storage device, sending an error, and waiting for another indication to back up the one or more pieces of identified data from the local storage device.

5. The method of claim 1, wherein the local replication cache is at least one of limited in size, unlimited in size, compressed, encrypted, utilized with client side de-duplication, force validation of the replication status of the data in the local cache, or force the local cache to be cleared.

6. The method of claim 1, wherein an initial back up of the one or more pieces of identified data is not stored in the local replication cache.

7. A computer program product comprising a non-transitory computer readable storage medium having a computer readable program stored therein, wherein the computer readable program, when executed on a computing device, causes the computing device to:

responsive to an indication to back up one or more pieces of identified data from a local storage device, determine whether a primary storage device is available;

responsive to the primary storage device being available, back up the one or more pieces of identified data to the primary storage device and a local replication cache; and responsive to the backed-up data being replicated from the primary storage device to a secondary storage device, remove the backed-up data from the local replication cache, wherein the backed-up data being replicated from the primary storage device to the secondary storage device is identified by the computer readable program further causing the computing device to:

update a record for each piece of identified data in an object information data structure as being replicated;

compare a unique ID associated with each record in the object information data structure that has been successfully replicated to a unique ID associated with each piece of identified data in the local replication cache;

responsive to matching the unique ID associated with a record in the object information data structure that has been successfully replicated to the unique ID associated with a piece of identified data in the local replication cache, remove the piece of identified data from the local replication cache; and responsive to a failure to matching the unique ID associated with a record in the object information data structure that has been successfully replicated to a unique ID associated with a piece of identified data in the local replication cache, keep the piece of identified data in the local replication cache.

8. The computer program product of claim 7, wherein the computer readable program to back up the one or more pieces of identified data to the primary storage device and the local replication cache further causes the computing device to:

associate a unique identifier (ID) with each piece of identified data in the one or more pieces of identified data;

store the unique ID along with its associated piece of identified data in the primary storage device and the local replication cache;

create a record of each piece of identified data and the unique ID associated with the piece of identified data in an object information data structure; and mark the record of each piece of identified data in the object information data structure as requiring replication.

9. The computer program product of claim 7, wherein the computer readable program further causes the computing device to:

responsive to the primary storage device being unavailable, determine whether the secondary storage device is available;

responsive to the secondary storage device being available, back up the one or more pieces of identified data to the secondary storage device and the local replication cache; and responsive to the backed-up data being replicated from the secondary storage device to the primary storage device, remove the backed-up data from the local replication cache.

10. The computer program product of claim 9, wherein the computer readable program further causes the computing device to:

responsive to the secondary storage device being unavailable, cancel the back up of the one or more pieces of identified data from the local storage device, send an error, and wait for another indication to back up the one or more pieces of identified data from the local storage device.

11. The computer program product of claim 7, wherein the local replication cache is at least one of limited in size, unlimited in size, compressed, encrypted, utilized with client side de-duplication, force validation of the replication status of the data in the local cache, or force the local cache to be cleared.

12. The computer program product of claim 7, wherein an initial back up of the one or more pieces of identified data is not stored in the local replication cache.

13. An apparatus, comprising:
a processor; and
a memory coupled to the processor, wherein the memory comprises instructions which, when executed by the processor, cause the processor to:
responsive to an indication to back up one or more pieces of identified data from a local storage device, determine whether a primary storage device is available;
responsive to the primary storage device being available, back up the one or more pieces of identified data to the primary storage device and a local replication cache; and
responsive to the backed-up data being replicated from the primary storage device to a secondary storage device, remove the backed-up data from the local replication cache, wherein the backed-up data being replicated from the primary storage device to the secondary storage device is identified by the instructions further causing the processor to:
update a record for each piece of identified data in an object information data structure as being replicated;
compare a unique ID associated with each record in the object information data structure that has been successfully replicated to a unique ID associated with each piece of identified data in the local replication cache;
responsive to matching the unique ID associated with a record in the object information data structure that has been successfully replicated to the unique ID associated with a piece of identified data in the local replication cache, remove the piece of identified data from the local replication cache; and
responsive to a failure to match the unique ID associated a record in the object information data structure that has been successfully replicated to a unique ID associated with a piece of identified data in the local replication cache, keep the piece of identified data in the local replication cache.

14. The apparatus of claim 13, wherein the instructions to back up the one or more pieces of identified data to the primary storage device and the local replication cache further cause the processor to:
associate a unique identifier (ID) with each piece of identified data in the one or more pieces of identified data;
store the unique ID along with its associated piece of identified data in the primary storage device and the local replication cache;
create a record of each piece of identified data and the unique ID associated with the piece of identified data in an object information data structure; and
mark the record of each piece of identified data in the object information data structure as requiring replication.

15. The apparatus of claim 13, wherein the instructions further cause the processor to:
responsive to the primary storage device being unavailable, determine whether the secondary storage device is available;
responsive to the secondary storage device being available, back up the one or more pieces of identified data to the secondary storage device and the local replication cache; and
responsive to the backed-up data being replicated from the secondary storage device to the primary storage device, remove the backed-up data from the local replication cache.

16. The apparatus of claim 15, wherein the instructions further cause the processor to:
responsive to the secondary storage device being unavailable, cancel the back up of the one or more pieces of identified data from the local storage device, send an error, and wait for another indication to back up the one or more pieces of identified data from the local storage device.

17. The apparatus of claim 13, wherein the local replication cache is at least one of limited in size, unlimited in size, compressed, encrypted, utilized with client side de-duplication, force validation of the replication status of the data in the local cache, or force the local cache to be cleared.

18. The apparatus of claim 13, wherein an initial back up of the one or more pieces of identified data is not stored in the local replication cache.

* * * * *